US009145130B2

(12) United States Patent
Maruyama et al.

(10) Patent No.: US 9,145,130 B2
(45) Date of Patent: Sep. 29, 2015

(54) VEHICLE TRAVEL CONTROL DEVICE

(71) Applicant: HONDA MOTOR CO., LTD., Tokyo (JP)

(72) Inventors: Kohei Maruyama, Utsunomiya (JP); Yutaka Horiuchi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/359,627

(22) PCT Filed: Oct. 29, 2012

(86) PCT No.: PCT/JP2012/077844
§ 371 (c)(1),
(2) Date: May 21, 2014

(87) PCT Pub. No.: WO2013/077143
PCT Pub. Date: May 30, 2013

(65) Prior Publication Data
US 2014/0323265 A1    Oct. 30, 2014

(30) Foreign Application Priority Data

Nov. 25, 2011    (JP) ................................. 2011-257991

(51) Int. Cl.
*B60W 10/06*    (2006.01)
*B60W 10/08*    (2006.01)
(Continued)

(52) U.S. Cl.
CPC .................. *B60W 20/10* (2013.01); *B60K 6/20* (2013.01); *B60K 6/48* (2013.01); *B60K 26/021* (2013.01);
(Continued)

(58) Field of Classification Search
CPC ..... B60W 10/00; B60W 10/04; B60W 10/06; B60W 10/08; B60W 20/00; B60W 20/10; B60W 20/40
USPC ............... 180/65.265, 26.275, 65.28, 65.285, 180/65.29; 701/1, 22, 70, 99
See application file for complete search history.

(56) References Cited

U.S. PATENT DOCUMENTS

| 7,028,793 | B2 * | 4/2006 | Hu et al. ..................... 180/65.25 |
| 7,699,129 | B2 * | 4/2010 | Treharne et al. ......... 180/65.265 |
| 2009/0112382 | A1 | 4/2009 | Treharne et al. |

FOREIGN PATENT DOCUMENTS

| JP | 2010-000815 | 1/2005 |
| JP | 2005-271618 | 10/2005 |

(Continued)

OTHER PUBLICATIONS

Mechanical translation of JP2005271618, Oct. 6, 2005.*

(Continued)

*Primary Examiner* — John Walters
(74) *Attorney, Agent, or Firm* — Rankin, Hill & Clark LLP

(57) ABSTRACT

A vehicle travel control device sets a first travel state in which a vehicle is caused to travel only by an internal combustion engine and a second travel state in which the vehicle is caused to travel by the internal combustion engine and an electric motor. The first travel state and the second travel state are switched to each other on the basis of vehicle information including the depression amount of an accelerator pedal. When a remaining electric power amount detected by a remaining electric power amount detection unit is less than a first predetermined value, a reaction force application unit sets a first accelerator pedal depression amount threshold at which the reaction force of the accelerator pedal is increased just before the switching from the first travel state to the second travel state.

18 Claims, 9 Drawing Sheets

(51) Int. Cl.
*B60W 20/00* (2006.01)
*B60W 50/16* (2012.01)
*B60L 11/14* (2006.01)
*B60L 11/18* (2006.01)
*B60K 26/02* (2006.01)
*B60K 6/20* (2007.10)
*B60K 6/48* (2007.10)

(52) U.S. Cl.
CPC ............. *B60L 11/14* (2013.01); *B60L 11/1861* (2013.01); *B60W 20/00* (2013.01); *B60W 50/16* (2013.01); *B60K 2026/023* (2013.01); *B60W 2510/244* (2013.01); *Y02T 10/6221* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y10S 903/93* (2013.01); *Y10T 477/23* (2015.01)

(56) References Cited

FOREIGN PATENT DOCUMENTS

| | | |
|---|---|---|
| JP | 2006-180626 | 7/2006 |
| JP | 2008-261346 | 10/2008 |
| JP | 2009-107619 | 5/2009 |
| JP | 2009-162291 | 7/2009 |
| JP | 2010-228593 | 10/2010 |
| JP | 2010-283968 | 12/2010 |

OTHER PUBLICATIONS

Japanese Office Action dated Jan. 20, 2015, Application No. 2013-545858, partial English translation included, 4 pages.
International Search Report filed in PCT/JP2012/077844, date of mailing: Dec. 18, 2012.
Japanese Office Action dated Aug. 18, 2015, Application No. 2015-085532, partial English translation included.

* cited by examiner

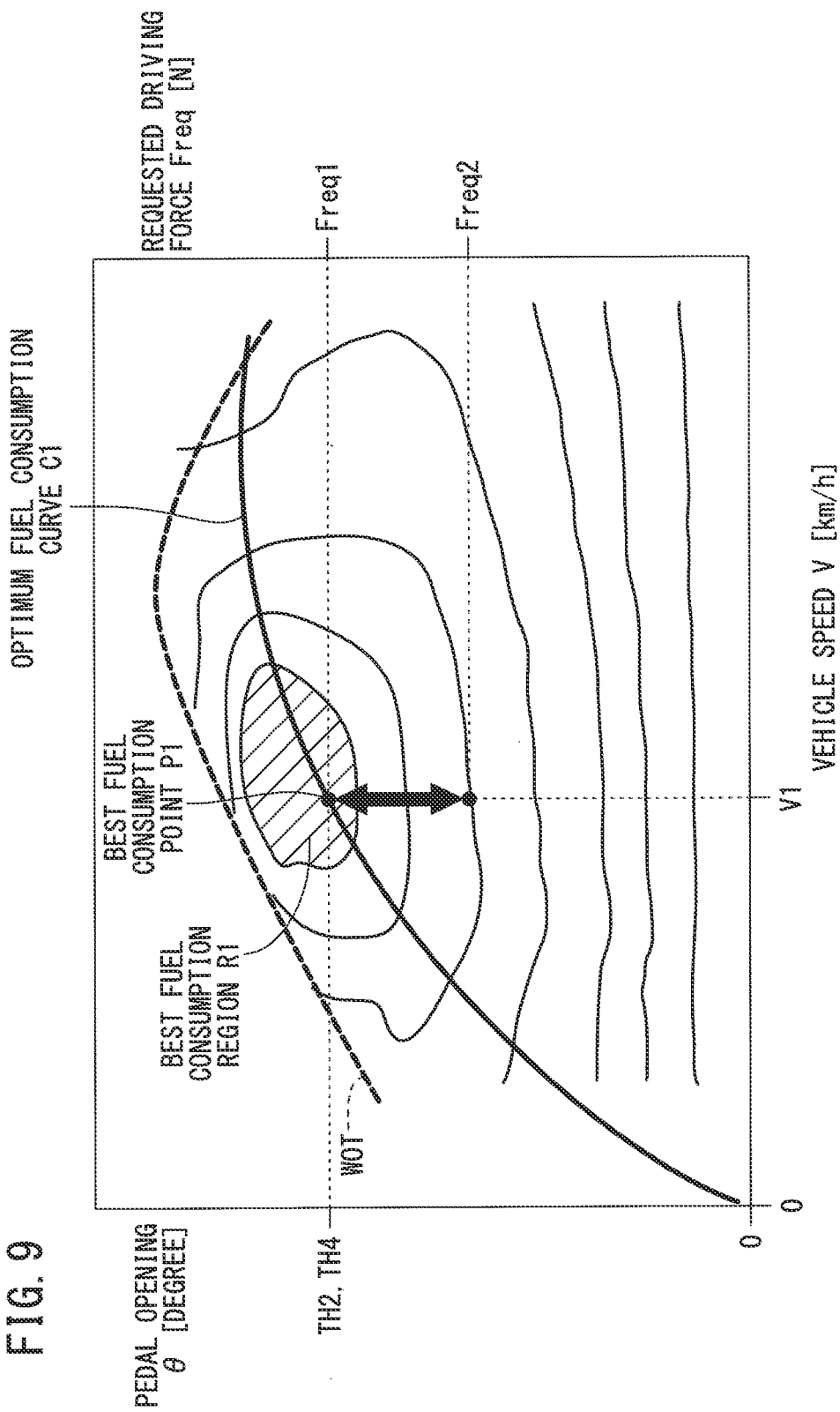

VEHICLE TRAVEL CONTROL DEVICE

TECHNICAL FIELD

The present invention relates to a vehicle travel control apparatus (device) for applying a reaction force to an accelerator pedal. More specifically, the present invention relates to a vehicle travel control apparatus for switching between respective operating states of a plurality of drive sources, which generate drive power depending on the opening of an accelerator pedal or the like, and for indicating the timing at which switching takes place by way of a reaction force, which is applied to an accelerator pedal, for thereby indicating the timing to the driver of a vehicle in which the vehicle travel control apparatus is incorporated.

BACKGROUND ART

Japanese Laid-Open Patent Publication No. 2005-271618 (hereinafter referred to as "JP 2005-271618 A") discloses an accelerator reaction force control apparatus for use in a hybrid electric automobile. According to JP 2005-271618 A, more specifically, the accelerator reaction force control apparatus has a motor traveling region within which the hybrid electric automobile is driven by a vehicle driving motor 7, and an engine traveling region within which the hybrid electric automobile is driven by an engine 6, and increases a depression reaction force applied to an accelerator pedal 2 when the motor traveling region changes to the engine traveling region (Abstract). Therefore, when the motor 7 switches to the engine 6, a reaction force is applied to the accelerator pedal 2 in order to inform the driver that switching is taking place with the reaction force applied to the accelerator pedal ([0005]).

JP 2005-271618 A also discloses a control process for charging a battery on a hybrid electric automobile by driving the hybrid electric automobile with only the engine 6 if the charged energy level of a battery on the hybrid electric vehicle is not equal to or greater than a predetermined value (step S1: NO of FIG. 4→step S9, [0018], claim 2).

SUMMARY OF INVENTION

According to JP 2005-271618, as described above, if the charged energy level of the battery is not equal to or greater than a predetermined value, the hybrid electric vehicle is driven solely by the engine 6 while charging of the battery takes place. Therefore, even if the driver depresses the accelerator pedal a maximum amount within a movable range of the accelerator pedal in order to seek greater drive power, since the hybrid electric automobile is driven solely by the engine 6, the motor 7 cannot be energized to operate together with the engine 6, and the engine 6 alone may possibly fail to produce as much drive power as required by the driver.

The present invention has been made in view of the above drawbacks. It is an object of the present invention to provide a vehicle travel control apparatus, which makes it possible to drive a vehicle with both an internal combustion engine and an electric motor as drive sources, if necessary, even if the remaining electric power level of an electric storage device is low.

According to the present invention, there is provided a vehicle travel control apparatus comprising an electric motor configured to supply a first driving force to a drive wheel configured to drive a vehicle, an internal combustion engine configured to supply a second driving force to the drive wheel or the electric motor configured to drive the vehicle, an electric storage device configured to supply electric power to the electric motor, the electric storage device being chargeable and dischargeable, and a reaction force applying unit configured to apply a reaction force to an accelerator pedal. The vehicle travel control apparatus establishes, as driving modes for the vehicle, a first traveling mode to drive the vehicle with only the internal combustion engine, and a second traveling mode to drive the vehicle with the internal combustion engine and the electric motor. The vehicle travel control apparatus switches between the first traveling mode and the second traveling mode based on vehicle information including an opening of the accelerator pedal. The vehicle travel control apparatus establishes the first traveling mode so as to correspond to the opening of the accelerator pedal, which is less than the opening of the accelerator pedal in the second traveling mode. The vehicle travel control apparatus further comprises a remaining electric power level detecting unit configured to detect a remaining electric power level of the electric storage device, wherein if the remaining electric power level detected by the remaining electric power level detecting unit is less than a first predetermined value, the reaction force applying unit establishes a first accelerator pedal opening threshold value for increasing the reaction force applied to the accelerator pedal just short of switching from the first traveling mode to the second traveling mode.

According to the present invention, if the remaining electric power level of the electric storage device is less than the first predetermined value, the reaction force applying unit increases the reaction force applied to the accelerator pedal just short of switching from the first traveling mode to drive the vehicle with only the internal combustion engine to the second traveling mode to drive the vehicle with the internal combustion engine and the electric motor, i.e., while the vehicle is being driven in the first traveling mode. Therefore, if the driver of the vehicle depresses the accelerator pedal through an angle in excess of the opening for increasing the reaction force, it is possible for the vehicle to be driven with the internal combustion engine and the electric motor, and hence a large driving force can be generated depending on the driver's intention to accelerate the vehicle.

Further, if the driver keeps the accelerator pedal at an angle that does not exceed the threshold value for increasing the reaction force, the electric motor is not energized. Therefore, it is possible to prevent consumption of electric power from the electric storage device, which would otherwise be dissipated if the electric motor were energized. Alternatively, it is possible to promote charging of the electric storage device with the internal combustion engine, which is being driven, or the electric motor that is operated in a regenerative mode.

The vehicle travel control apparatus may further comprise an electric generator configured to generate electric power in response to the internal combustion engine being operated, and to charge the electric storage device with the generated electric power. The first accelerator pedal opening threshold value may be established in a region within which an amount of electric power generated by the electric generator, which is actuated when the internal combustion engine is driven by a unit amount of fuel, is equal to or greater than a first electric power level threshold value. Consequently, if the driver keeps the accelerator pedal at the first accelerator pedal opening threshold value or in the vicinity thereof, it is possible for the amount of electric power generated by the electric generator to be relatively large. Therefore, it is possible to promote charging of the electric storage device.

The vehicle travel control apparatus may further comprise an electric motor control unit configured to control the electric motor to be driven and to regenerate or generate electric power. The electric motor may regenerate or generate electric power in response to the internal combustion engine being operated, and charge the electric storage device with the regenerated or generated electric power. When the vehicle is driven in the first travelling mode, the electric motor control unit may control the electric motor so as to be regenerated or generate electric power by the internal combustion engine. The first accelerator pedal opening threshold value may be established in a region within which the amount of electric power generated by the electric motor, which is actuated when the internal combustion engine is driven by a unit amount of fuel, is equal to or greater than a second electric power level threshold value. Consequently, if the driver keeps the accelerator pedal at the first accelerator pedal opening threshold value or in the vicinity thereof, it is possible for the amount of electric power generated by the electric motor to be relatively large. Therefore, it is possible to promote charging of the electric storage device.

The vehicle travel control apparatus may establish, as a driving mode for the vehicle, a third traveling mode to drive the vehicle with only the electric motor so as to correspond to the opening of the accelerator pedal, which is less than the opening of the accelerator pedal in the first traveling mode. Further, if the remaining electric power level detected by the remaining electric power level detecting unit is greater than a second predetermined value, the reaction force applying unit may establish a second accelerator pedal opening threshold value for increasing the reaction force applied to the accelerator pedal just short of switching from the third traveling mode to the first traveling mode.

If the remaining electric power level of the electric storage device exceeds the second predetermined value, the reaction force applied to the accelerator pedal is, increased just short of switching from the third traveling mode to drive the vehicle with only the electric motor to the first traveling mode to drive the vehicle with only the internal combustion engine, i.e., while the vehicle is being driven in the third traveling mode. Generally, while the vehicle is being driven in a low speed range, in comparison to being driven by the internal combustion engine, the mileage of the vehicle is higher if the vehicle is driven only by the electric motor. With the above arrangement, therefore, it is possible to cause the driver to promote driving of the vehicle with only the electric motor, for thereby driving the vehicle with higher mileage, by having the driver recognize that switching is taking place between driving of the vehicle with only the electric motor, and driving of the vehicle with only the internal combustion engine.

The vehicle travel control apparatus may permit the third traveling mode to be used if the remaining electric power level exceeds a second predetermined value, and inhibit the third traveling mode from being used if the remaining electric power level is less than the second predetermined value. In this case, if the opening of the accelerator pedal is zero, if the reaction force is not generated by the reaction force applying unit, or if a reaction force generating command is not supplied from the reaction force applying unit, a control process at time the remaining electric power level exceeds the second predetermined value and a control process at time the remaining electric power level is less than the second predetermined value are switched. Therefore, it is possible to prevent the driver from feeling uncomfortable due to the occurrence of switching between the control process at the time that the remaining electric power level is higher than the second predetermined value, and the control process at the time that the remaining electric power level is less than the second predetermined value.

The first traveling mode may include an all-cylinder-enabled mode in which all of cylinders of the internal combustion engine are enabled, and a cylinder-disabled mode in which only some of the cylinders of the internal combustion engine are enabled. Using the cylinder-disabled mode together with the all-cylinder-enabled mode, it is possible to drive the vehicle while fuel consumption is taken into consideration.

The cylinder-disabled mode may be established in a region within which a speed of the vehicle exceeds a vehicle speed at which the third traveling mode is established. When the third traveling mode to drive the vehicle with only the electric motor is switched to the first traveling mode (cylinder-disabled mode) to drive the vehicle with only the internal combustion engine, only some of the cylinders of the internal combustion engine are enabled for thereby improving fuel consumption and achieving better mileage.

The reaction force applying unit may establish a cylinder-disabling assistance threshold value for increasing the reaction force applied to the accelerator pedal just short of switching between the cylinder-disabled mode and the all-cylinder-enabled mode. It is thus possible to inform the driver that switching is taking place between the cylinder disabled mode and the all-cylinder-enabled mode. As a result, fuel consumption can be improved, for example, by taking efforts to cause the driver to maintain the cylinder-disabled mode.

The cylinder-disabling assistance threshold value may be established so as to be less than the first accelerator pedal opening threshold value. Therefore, it is possible to apply a reaction force in consideration of energy efficiency.

The second accelerator pedal opening threshold value and the cylinder-disabling assistance threshold value may be established on basis of the opening of the accelerator pedal, a requested or actual driving force or a throttle valve opening of the vehicle, and a vehicle speed or a rotational speed of the internal combustion engine. In this case, if the second accelerator pedal opening threshold value and the cylinder-disabling assistance threshold value are switched depending on the vehicle speed or the rotational speed of the internal combustion engine, the second accelerator pedal opening threshold value and the cylinder-disabling assistance threshold value may be established as consecutive values. Therefore, upon switching between the second accelerator pedal opening threshold value and the cylinder-disabling assistance threshold value, the reaction force does not change significantly, thereby making it possible to prevent the driver from feeling uncomfortable.

BRIEF DESCRIPTION OF DRAWINGS

FIG. 9 is a diagram illustrating a modified process for setting a high efficiency output assistance threshold value and a charging promotion assistance threshold value.

DESCRIPTION OF EMBODIMENTS

A. Embodiment
1. Arrangement of Vehicle 10
[1-1. Overall Arrangement]

Figure 1:
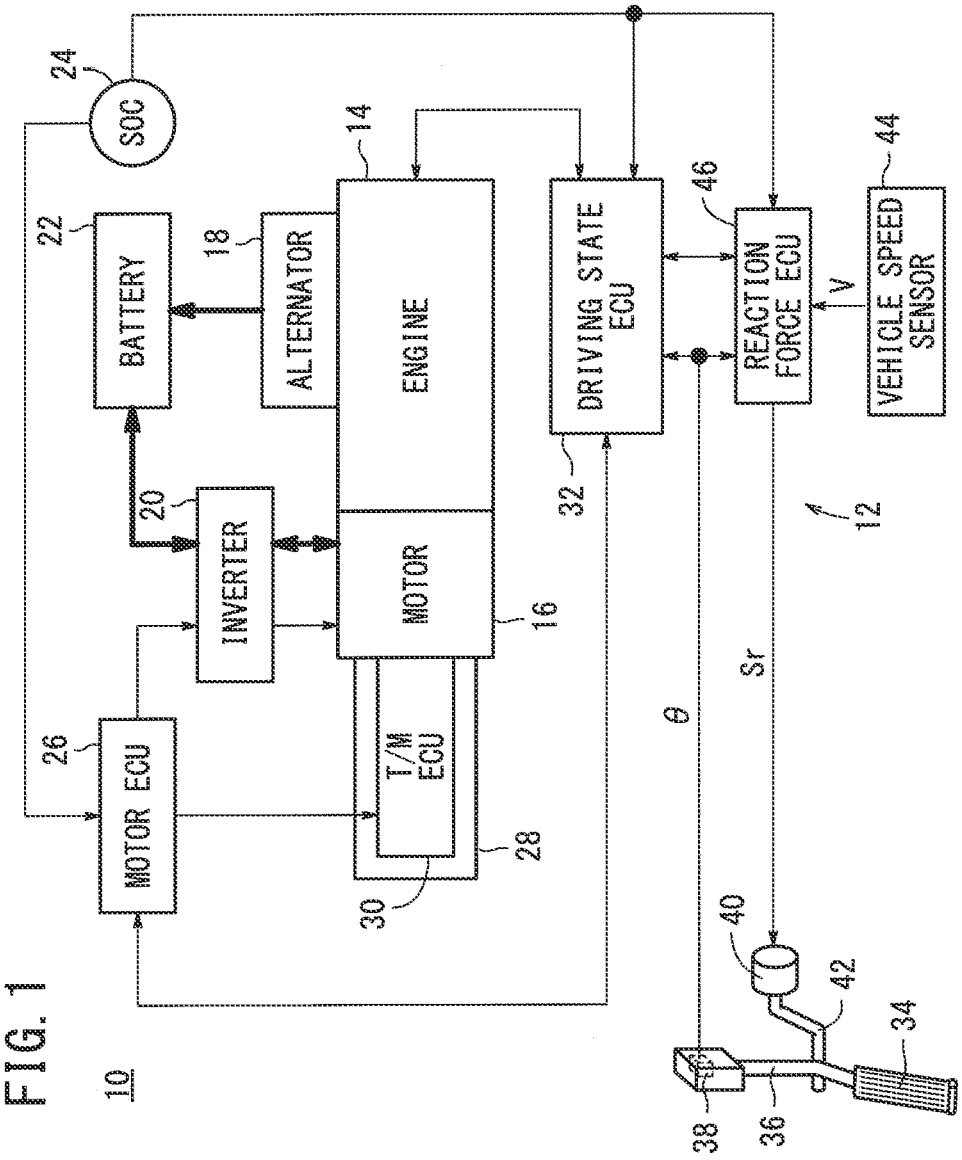
FIG. 1 is a block diagram of a vehicle in which a vehicle travel control apparatus according to an embodiment of the present invention is incorporated.

FIG. 1 shows in block form a vehicle 10 in which a vehicle travel control apparatus 12 (hereinafter referred to as a "travel control apparatus 12" or a "control apparatus 12") is incorporated in the vehicle 10 according to an embodiment of the present invention. The vehicle 10 comprises a so-called hybrid vehicle, which includes an engine 14 and a traction motor 16 (hereinafter also referred to as a "motor 16") as drive sources.

As shown in FIG. 1, the vehicle 10 includes, in addition to the engine 14 (internal combustion engine) and the motor 16 (electric motor), an alternator 18 (electric generator), an inverter 20, a battery 22 (electric storage device), an SOC (State of Charge) sensor 24, a motor electronic control unit 26 (hereinafter referred to as a "motor ECU 26"), a transmission 28, a transmission electronic control unit 30 (hereinafter referred to as a "T/M ECU 30"), a driving state electronic control unit 32 (hereinafter referred to as a "driving state ECU 32"), an accelerator pedal 34, a pedal side arm 36, an opening sensor 38, a reaction force motor 40, a motor side arm 42, a vehicle speed sensor 44, and a reaction force electronic control unit 46 (hereinafter referred to as a "reaction force ECU 46").

According to the present embodiment, as described later, the drive sources are selected, i.e., one or both of the engine 14 and the traction motor 16 are used, depending on the opening of the accelerator pedal 34 (hereinafter referred to as a "pedal opening θ"). Using a reaction force applied from the reaction force motor 40 to the accelerator pedal 34 (hereinafter referred to as a "pedal reaction force Fr"), the travel control apparatus 12 according to the present invention guides the driver of the vehicle 10 to operate the accelerator pedal 34 in order to appropriately select the drive sources.

[1-2. Accelerator Pedal 34 and Related Components]

The accelerator pedal 34, which serves to control the output of the drive sources, is fixed to the pedal side arm 36. The pedal side arm 36 is swingably coupled to a non-illustrated return spring. When the driver releases the accelerator pedal 34, the accelerator pedal 34 returns to its original position under a biasing force from the return spring (spring reaction force Fr_sp).

The opening sensor 38 detects an angle through which the accelerator pedal 34 is depressed from the original position (pedal opening θ), and sends the detected angle to the driving state ECU 32 and the reaction force ECU 46. The pedal opening θ is used to control the drive sources (the engine 14 and the traction motor 16), and also is used to control the reaction force applied to the accelerator pedal 34 (pedal reaction force Fr).

The motor side arm 42 is swingably disposed in a position for abutment against the pedal side arm 36. The reaction force motor 40 actuates the motor side arm 42 to apply a pedal reaction force Fr to the pedal side arm 36 and the accelerator pedal 34. The reaction force ECU 46 includes an input/output unit, a processor, and a memory, not shown, and controls the driving force of the reaction force motor 40, i.e., the pedal reaction force Fr, with a reaction force generating command Sr, which is based on the pedal opening θ, the vehicle speed V of the vehicle 10, etc. The reaction force motor 40 may be replaced with a different type of driving force generating unit, such as a pneumatic actuator, for example. The reaction force motor 40 and the reaction force ECU 46 function collectively as a reaction force applying unit for applying the pedal reaction force Fr to the accelerator pedal 34.

[1-3. Drive Sources and Related Components]

The engine 14 (internal combustion engine), which serves as a drive source for driving the vehicle 10, generates a driving force Fe [N] or a torque [N·m], supplies the generated driving force or the torque to non-illustrated drive wheels of the vehicle 10, and actuates the alternator 18 in order to generate electric power. The electric power [W] generated by the alternator 18 (hereinafter referred to as "generated electric power Pgen") is supplied to the battery 22, a 12-volt system, or to various accessories, not shown. According to the present embodiment, the engine 14 comprises an 8-cylinder engine, which is capable of operating in a cylinder-disabled mode in which only some of the cylinders are enabled whereas other cylinders thereof are disabled.

The traction motor 16 (electric motor), which comprises a three-phase AC brushless motor, generates a driving force Fm [N] or torque [N·m] for the vehicle 10 based on electric power supplied from the battery 22 through the inverter 20. The traction motor 16 supplies the generated driving force or torque to the drive wheels. The traction motor 16 generates electric power by retrieving deceleration energy as regenerative energy (hereinafter referred to as "regenerated electric power Preg") [W], and supplies the regenerated electric power Preg to the battery 22 in order to charge the battery 22. The regenerated electric power Preg may also be supplied to the 12-volt system or to various accessories, not shown.

The inverter 20, which is of a three-phase bridge design, converts DC power into three-phase AC power and supplies the three-phase AC power to the traction motor 16. The inverter 20 also converts AC power, which is regenerated by the traction motor 16 while operating in a regenerative mode, into DC power and supplies the DC power to the battery 22.

The SOC sensor 24 (remaining electric power level detecting unit) comprises a non-illustrated current sensor, etc. The SOC sensor 24 detects the remaining electric power level (SOC: State Of Charge) of the battery 22, and sends a signal representing the detected SOC to the motor ECU 26, the driving state ECU 32, and the reaction force ECU 46.

The motor ECU 26 (electric motor control unit) controls the inverter 20 based on a command from the driving state ECU 32, and output signals from various non-illustrated sensors including a voltage sensor, a current sensor, etc., for thereby controlling the output (propulsive power) of the traction motor 16. The motor ECU 26 also controls operation of the transmission 28 through the T/M ECU 30.

The driving state ECU 32 serves as an engine electronic control unit (hereinafter referred to as an "engine ECU") for controlling the engine 14, and also controls a drive source assembly that includes the engine 14 and the traction motor 16 based on the pedal opening θ, the vehicle speed V, etc.

2. Controls According to the Present Embodiment

[2-1. Switching Between Drive Sources]

(2-1-1. General)

According to the present embodiment, the drive sources are selected, i.e., driving states of the vehicle 10 are selected, to drive the vehicle 10 selectively in respective traveling modes, including a mode (hereinafter referred to as an "MOT mode") in which only the traction motor 16 is operated depending on the vehicle speed V and a requested driving force Freq [N] (or a requested torque [N·m]) for the traction motor 16, a mode (hereinafter referred to as an "ENG mode") in which only the engine 14 is operated with all cylinders thereof enabled, a mode (hereinafter referred to as an "ENG+MOT mode") in which both the traction motor 16 and the engine 14 are operated, and a mode (hereinafter referred to as a "cylinder-disabled mode") in which only the engine 14 is operated with a portion of the cylinders thereof disabled. The above traveling modes are selected or switched depending on the vehicle speed V, the remaining electric power level (SOC) of the battery 22, and the pedal opening θ. The pedal opening θ can be interpreted substantially as being indicative of the requested driving force Freq for the traction motor 16.

(2-1-2. Switching Characteristics for the Drive Sources when the Remaining Electric Power Level of the Battery 22 is High)

Figure 2:
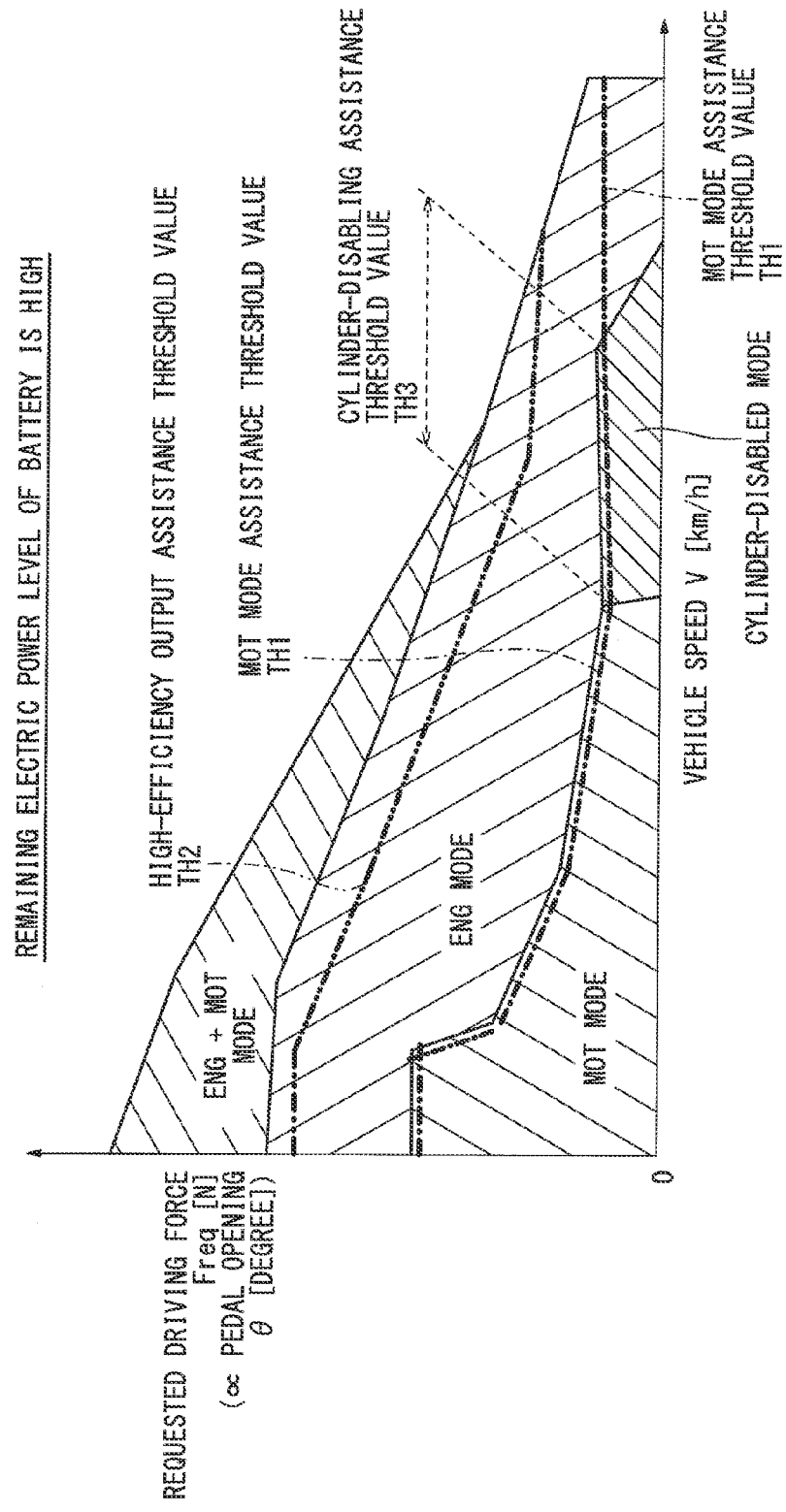
FIG. 2 is a diagram showing selection characteristics for drive sources, at the time that the remaining electric power level of a battery is high, i.e., a map for a high remaining electric power level.

FIG. 2 shows selection characteristics for the drive sources when the remaining electric power level of the battery 22 is high, i.e., a map for a high remaining electric power level. In the event that the remaining electric power level of the battery 22 is high, the battery 22 maintains a sufficient level of electric power, which is large enough to drive the vehicle 10 with only the traction motor 16, for example. Specific values of the remaining electric power level may be established appropriately depending on the specifications of the traction motor 16, etc.

As shown in FIG. 2, if the vehicle speed V is relatively low and the pedal opening θ is relatively small, i.e., if the requested drive force Freq is small, the MOT mode is selected. If the pedal opening θ is greater than in the MOT mode, i.e., if the requested drive force Freq is greater than in the MOT mode, or if the vehicle speed V is higher than in the MOT mode, the ENG mode is selected. If the pedal opening θ is greater than in the ENG mode, i.e., if the requested drive force Freq is greater than in the ENG mode, or if the vehicle speed V is higher than in the ENG mode, the ENG+MOT mode is selected. If the pedal opening θ is relatively small and the vehicle speed V is higher than in the MOT mode, i.e., if the requested driving force Freq is small while the vehicle 10 is being driven at low speed, the cylinder-disabled mode is selected.

(2-1-3. Switching Characteristics for the Drive Sources when the Remaining Electric Power Level of the Battery 22 is Low)

Figure 3:
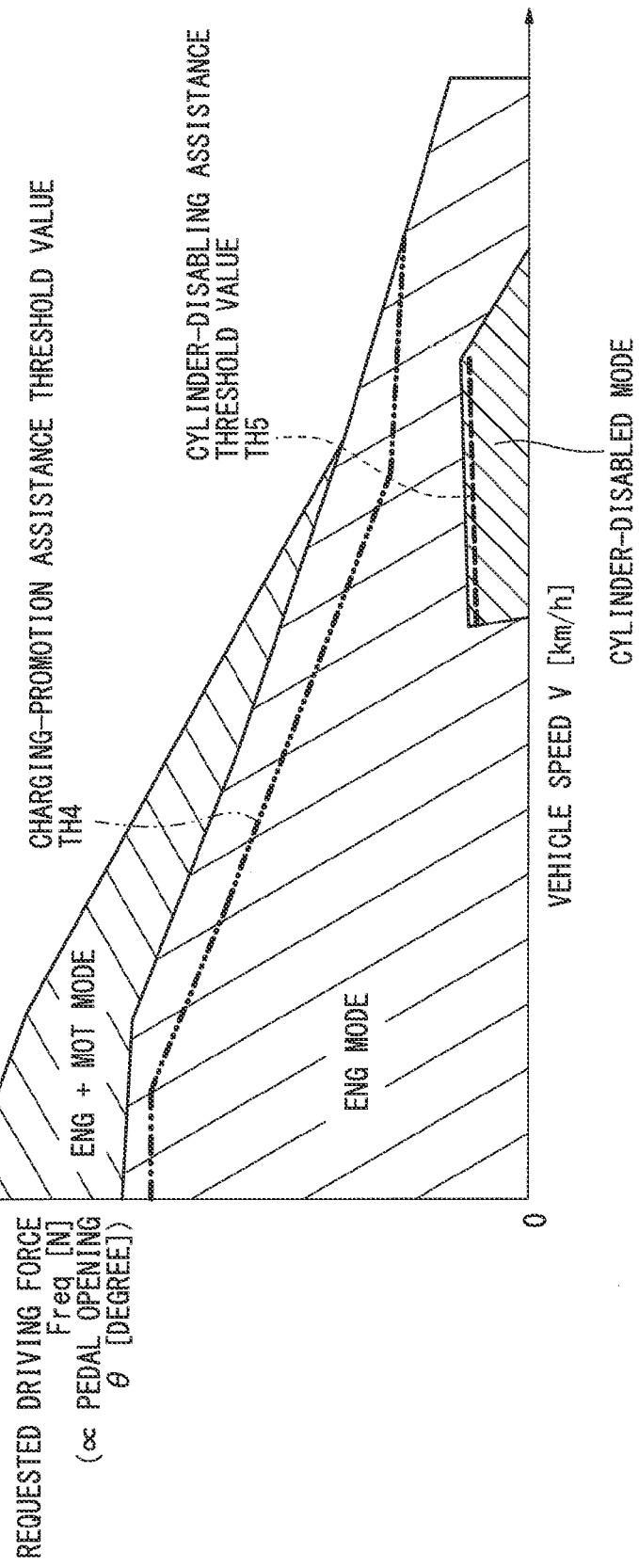
FIG. 3 is a diagram showing selection characteristics for drive sources, at the time that the remaining electric power level of the battery is low, i.e., a map for a low remaining electric power level.

FIG. 3 shows selection characteristics for the drive sources when the remaining electric power level of the battery 22 is low, i.e., a map for a low remaining electric power level. When the remaining electric power level of the battery 22 is low, the battery 22 does not maintain a sufficient level of electric power, which is large enough to drive the vehicle 10 with only the traction motor 16, for example. Specific values of the remaining electric power level may be established appropriately depending on the specifications of the traction motor 16, etc.

Compared with the selection characteristics shown in FIG. 2, the selection characteristics shown in FIG. 3 do not have a region for the MOT mode, because the selection characteristics shown in FIG. 3 are used when the remaining electric power level of the battery 22 is low, and hence the vehicle 10 is prevented from being driven only by the traction motor 16 that must be supplied with a large amount of electric power from the battery 22. Rather, the engine 14 is operated even though the vehicle speed V is low and the requested driving force Freq is small. Consequently, electric power consumed by the battery 22 is minimized, and the battery 22 is charged by the alternator 18, which is actuated due to operation of the engine 14.

[2-2. Control of Pedal Reaction Force Fr]

According to the present embodiment, using the pedal reaction force Fr, the driver can be guided to operate the accelerator pedal 34 in order to appropriately select the drive sources (the engine 14 and the traction motor 16).

(2-2-1. When the Remaining Electric Power Level of the Battery 22 is High)

(2-2-1-1. MOT Mode Assistance)

Generally, when the vehicle speed V is low and the requested driving force Freq is small, lower fuel consumption efficiency results if the vehicle 10 is driven by the engine 14, whereas higher fuel consumption efficiency results if the vehicle 10 is driven by the traction motor 16. According to the present embodiment, if the vehicle speed V is low and the requested driving force Freq is small while the remaining electric power level of the battery 22 is high, the MOT mode is selected (FIG. 2). At a pedal opening θ upon switching between the MOT mode and the ENG mode, the pedal reaction force Fr is increased, so as to inform the driver of the pedal opening θ upon switching between the MOT mode and the ENG mode, and thereby prompting the driver to select the MOT mode.

More specifically, as shown in FIG. 2, when the pedal opening θ exists on a line indicated by "TH1" (hereinafter referred to as a "MOT mode assistance threshold value TH1", a "first reaction force increasing threshold value TH1", or a "threshold value TH1") in relation to the vehicle speed V, the reaction force ECU 46 increases the pedal reaction force Fr. As shown in FIG. 2, the first reaction force increasing threshold value TH1 is set as a curve, which extends over a third reaction force increasing threshold value TH3, to be described later. Stated otherwise, the first reaction force increasing threshold value TH1 is set as a curve, which is interrupted by the curve of the third reaction force increasing threshold value TH3 that exists within the interrupted interval. The first reaction force increasing threshold value TH1 and the third reaction force increasing threshold value TH3 are contiguous, i.e., are defined by consecutive values that do not change significantly from one to the other.

(2-2-1-2. High Efficiency Output Assistance)

For increasing the output of the vehicle 10, such as when the vehicle 10 is quickly accelerated, both the engine 14 and the traction motor 16 may be operated simultaneously. However, energy efficiency of the vehicle 10 typically is lowered when both the engine 14 and the traction motor 16 are operated simultaneously. From the standpoint of energy efficiency, insofar as possible, it is preferable to prevent the engine 14 and the traction motor 16 from being operated simultaneously. According to the present embodiment, when the remaining electric power level of the battery 22 is high, the pedal reaction force Fr is increased at a pedal opening θ, which is less than the pedal opening θ that occurs upon switching between the ENG mode and the ENG+MOT mode, thereby informing the driver of the pedal opening θ upon switching between the ENG mode and the ENG+MOT mode, and prompting the driver to avoid selecting the ENG+MOT modes.

When the vehicle 10 is driven by only the engine 14, the vehicle 10 may be driven with high energy efficiency and the vehicle 10 may be driven with low energy efficiency. According to the present embodiment, the pedal reaction force Fr is increased at a pedal opening θ for achieving higher energy efficiency from among pedal openings θ that are less than the pedal opening θ upon switching between the ENG mode and the ENG+MOT mode.

More specifically, in FIG. 2, when the pedal opening θ exists on a line indicated by "TH2" (hereinafter referred to as a "high efficiency output assistance threshold value TH2", a "second reaction force increasing threshold value TH2", or a "threshold value TH2") in relation to the vehicle speed V, the reaction force ECU 46 increases the pedal reaction force Fr. The high efficiency output assistance threshold value TH2 is set to a value in a region (hereinafter referred to as a "high efficiency electric generating region" or a "charging promotion region") where the energy•torque, which is obtained by a unit amount (e.g., 1 cc) of fuel, is maximum. Thus, the amount of electric power, which is generated by the alternator 18 at the time that the engine 14 is driven by a unit amount of fuel, becomes relatively high.

Alternatively, as described later, a pedal opening θ at a best fuel consumption point or within a best fuel consumption region, which is obtained on the basis of a net fuel consumption ratio (BSFC: Brake Specific Fuel Consumption) in light of the relationship between the pedal opening θ and the vehicle speed V (or an engine rotational speed [rpm]), may be set as the high efficiency output assistance threshold value TH2.

(2-2-1-3. Cylinder-Disabled Assistance)

Even when the vehicle 10 is driven at high speed, if the requested driving force Freq is small, the fuel consumption of the vehicle 10 can be improved by operating the engine 14 in the cylinder-disabled mode. From the standpoint of fuel consumption, it is preferable for the engine 14 to be operated in the cylinder-disabled mode rather than in an all-cylinder-enabled mode. According to the present embodiment, when the remaining electric power level of the battery 22 is high, the pedal reaction force Fr is increased at a pedal opening θ just short of switching between the cylinder-disabled mode and the ENG mode, thereby informing the driver of the pedal opening θ that occurs upon switching between the cylinder-disabled mode and the ENG mode, and prompting the driver to select the cylinder-disabled mode.

More specifically, in FIG. 2, when the pedal opening θ exists on a line indicated by "TH3" (hereinafter referred to as a "cylinder-disabling assistance threshold value TH3", a "third reaction force increasing threshold value TH3", or a "threshold value TH3") in relation to the vehicle speed V, the reaction force ECU 46 increases the pedal reaction force Fr. Hereinafter, the first through third reaction force increasing threshold values TH1, TH2, TH3 will also be referred to collectively as "threshold values for the high remaining electric power level", (2-2-1-4. Specific Examples)

Figure 4:
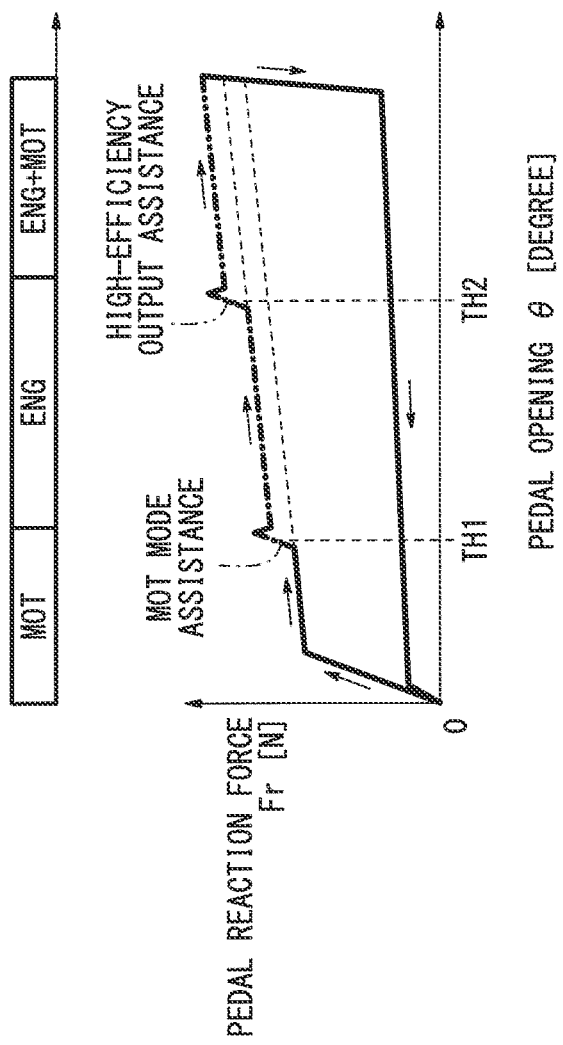
FIG. 4 is a diagram showing a first example of a relationship between the opening of an accelerator pedal (pedal opening) and a reaction force applied to the accelerator pedal (pedal reaction force), in the case that the pedal opening is increased and then reduced at a time when the remaining electric power level of the battery is high.

FIG. 4 shows a first example of a relationship between the pedal opening θ and the pedal reaction force Fr, in the case that the pedal opening θ is increased and then reduced at a time when the remaining electric power level of the battery 22 is high.

As shown in FIG. 4, when the pedal opening θ increases from zero, the MOT mode is selected first. As the pedal opening θ goes higher, the MOT mode changes to the ENG mode. Just short of changing from the MOT mode to the ENG mode at the MOT mode assistance threshold value TH1, the pedal reaction force Fr increases sharply, thereby enabling the driver to recognize that switching is taking place from the MOT mode to the ENG mode.

A further increase in the pedal opening θ causes the ENG mode to change to the ENG+MOT mode. Just short of changing from the ENG mode to the ENG+MOT mode at the high efficiency output assistance threshold value TH2, the pedal reaction force Fr increases sharply, thereby enabling the driver to recognize that switching is taking place from the ENG mode to the ENG+MOT mode.

Figure 5:
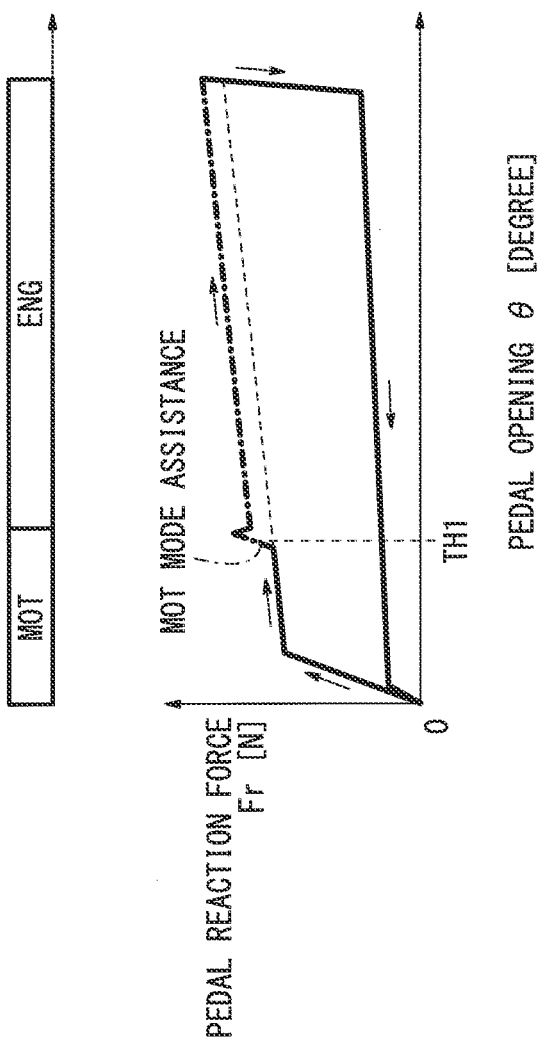
FIG. 5 is a diagram showing a second example of a relationship between the pedal opening and the pedal reaction force, in the case that the pedal opening is increased and then reduced at a time when the remaining electric power level of the battery is high.

FIG. 5 shows a second example of a relationship between the pedal opening θ and the pedal reaction force Fr, in the case that the pedal opening θ is increased and then reduced at a time when the remaining electric power level of the battery 22 is high.

As shown in FIG. 5, when the pedal opening θ increases from zero, the MOT mode is selected first. As the pedal opening θ goes higher, the MOT mode changes to the ENG mode. Just short of changing from the MOT mode to the ENG mode at the MOT mode assistance threshold value TH1, the pedal reaction force Fr increases sharply, thereby enabling the driver to recognize that switching is taking place from the MOT mode to the ENG mode. In the second example shown in FIG. 5, the ENG mode does not switch to the ENG+MOT mode.

(2-2-2. When the Remaining Electric Power Level of the Battery 22 is Low)

(2-2-2-1. Charging Promotion Assistance)

When the remaining electric power level of the battery 22 is low, it is desirable to charge the battery 22. According to the present embodiment, if the remaining electric power level of the battery 22 is low, the pedal reaction force Fr is increased at a pedal opening θ at which the engine 14 actuates the alternator 18 in order to generate electric power at high efficiency and to charge the battery 22 with ease, thereby informing the driver of the pedal opening θ between the MOT mode and the ENG mode, and thereby prompting the driver to charge the battery 22 quickly.

More specifically, in FIG. 3, if the pedal opening θ exists on a line indicated by "TH4" (hereinafter referred to as a "charging promotion assistance threshold value TH4", a "fourth reaction force increasing threshold value TH4", or a "threshold value TH4") in relation to the vehicle speed V, the reaction force ECU 46 increases the pedal reaction force Fr.

The charging promotion assistance threshold value TH4 may be the same or different from the high efficiency output assistance threshold value TH2 shown in FIG. 2, insofar as the charging promotion assistance threshold value TH4 is capable of at least informing the driver of the pedal opening θ upon switching between the MOT mode and the ENG mode, and prompting the driver to charge the battery 22 quickly.

(2-2-2-2. Cylinder-Disabled Assistance)

Similar to the case of the cylinder-disabling assistance threshold value TH3 (third reaction force increasing threshold value TH3) shown in FIG. 2, the line indicated by "TH5" in FIG. 3 represents a threshold value for sharply increasing the pedal reaction force Fr (hereinafter referred to as a "cylinder-disabling assistance threshold value TH5", a "fifth reaction force increasing threshold value TH5", or a "threshold value TH5") just short of switching from the cylinder-disabled mode to the ENG mode. The fourth and fifth reaction force increasing threshold values TH4, TH5 will hereinafter also be referred to collectively as "threshold values for the low remaining electric power level".

(2-2-2-3. Specific Examples)

Figure 6:
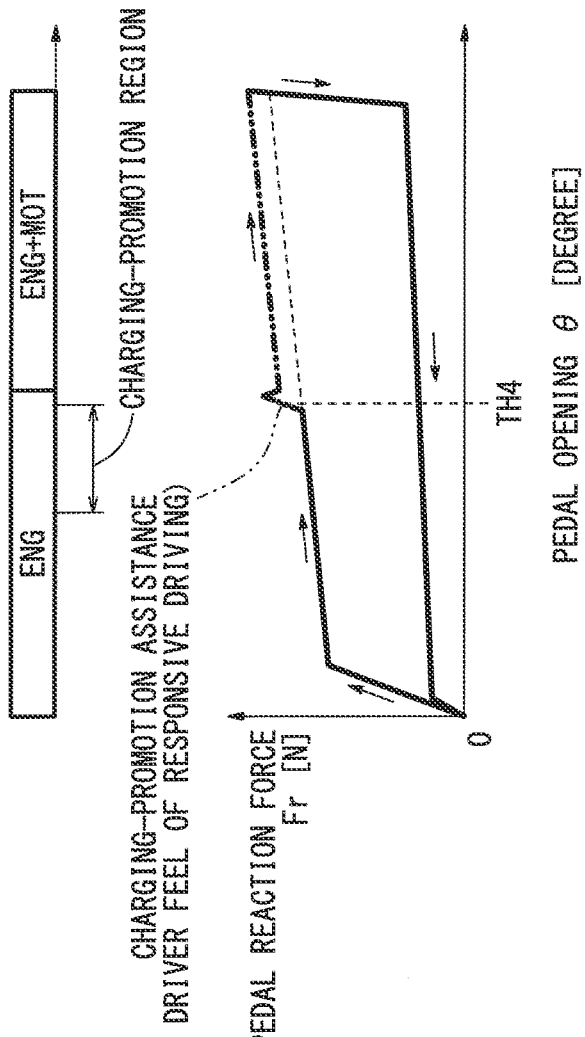
FIG. 6 is a diagram showing an example of a relationship between the pedal opening and the pedal reaction force, in the case that the pedal opening is increased and then reduced at a time when the remaining electric power level of the battery is low.

FIG. 6 shows an example of a relationship between the pedal opening θ and the pedal reaction force Fr, in the case that the pedal opening θ is increased and then reduced at a time when the remaining electric power level of the battery 22 is low.

As shown in FIG. 6, when the pedal opening θ increases from zero, the ENG mode is selected without any involvement of the MOT mode. As the pedal opening θ goes higher, the ENG mode changes to the ENG+MOT mode. Just short of changing from the ENG mode to the ENG+MOT mode at the charging promotion assistance threshold value TH4, and within a charging promotion assistance region, the pedal reaction force Fr increases sharply, thereby allowing the driver to recognize that switching is taking place from the ENG mode to the ENG+MOT mode. According to the present embodiment, in addition, since the engine 14 is an 8-cylinder engine, when the vehicle 10 is driven in the vicinity of an upper limit of the region in which only the engine 14 is operated, the driver can experience a sporty feel or a feel of responsive driving.

(2-2-3. Setting of Pedal Reaction Force Fr)

Figure 7:
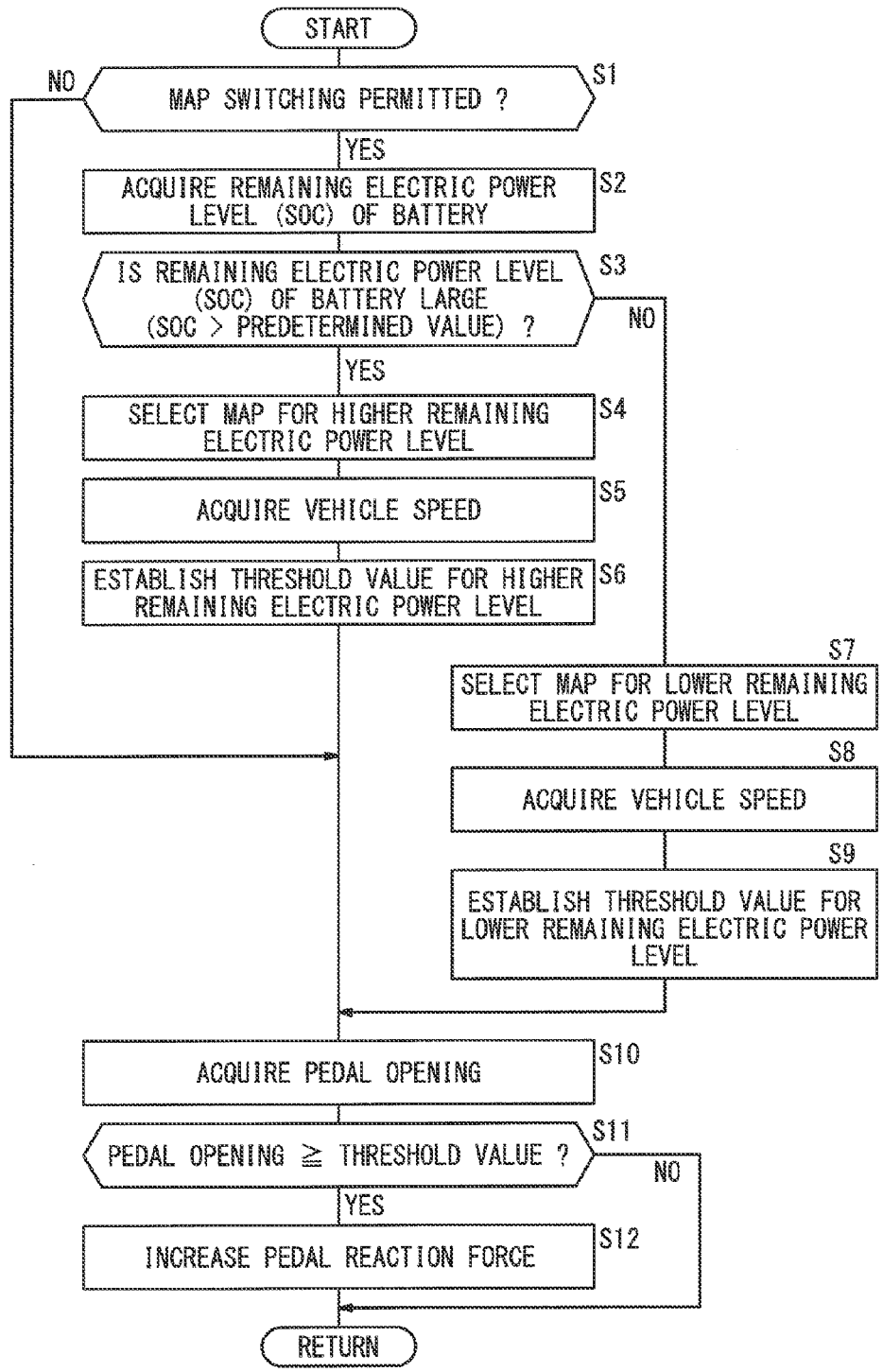
FIG. 7 is a flowchart of a sequence followed by a reaction force electronic control unit in order to set a pedal reaction force.

FIG. 7 is a flowchart of a sequence followed by the reaction force ECU 46 to set the pedal reaction force Fr. In step S1, the reaction force ECU 46 judges whether or not switching should be permitted between a map for a large reaction force (FIG. 2) and a map for a small reaction force (FIG. 3). If the reaction force ECU 46 permits switching between such maps at all times, there is a possibility that the driver may feel uncomfortable. However, according to the present embodiment, the reaction force ECU 46 permits switching between such maps only when predetermined conditions are satisfied. More specifically, the reaction force ECU 46 permits switching between the maps when the pedal opening θ is zero, i.e., when the accelerator pedal 34 is in its original position, the reaction force motor 40 is not generating the pedal reaction force Fr, and the reaction force ECU 46 is not currently supplying the reaction force generating command Sr to the reaction force motor 40. The aforementioned permission conditions may be used in combination, or other permission conditions may be established.

If the reaction force ECU 46 permits switching between both of the maps (step S1: YES), control proceeds to step S2. If the reaction force ECU 46 does not permit switching between the maps (step S1: NO), control proceeds to step S10.

In step S2, the reaction force ECU 46 acquires the remaining electric power level (SOC) of the battery 22 from the SOC sensor 24. In step S3, the reaction force ECU 46 judges whether or not the remaining electric power level of the battery 22 is large. More specifically, the reaction force ECU 46 judges whether or not the SOC acquired in step S2 is greater than a predetermined value (SOC threshold value THsoc).

If the remaining electric power level of the battery 22 is large (step S3: YES), then in step S4, the reaction force ECU 46 selects the map for the high remaining electric power level (FIG. 2). In step S5, the reaction force ECU 46 acquires the vehicle speed V from the vehicle speed sensor 44.

In step S6, the reaction force ECU 46 establishes threshold values for the high remaining electric power level (first through third reaction force increasing threshold values TH1, TH2, TH3) in the map for the high remaining electric power level in relation to the vehicle speed V. As shown in FIG. 2, depending on the vehicle speed V, one or more of the first through third reaction force increasing threshold values TH1, TH2, TH3 may not be established.

Referring back to step S3, if the remaining electric power level of the battery 22 is not large (step S3: NO), then in step S1, the reaction force ECU 46 selects the map for the low remaining electric power level (FIG. 3). In step S8, the reaction force ECU 46 acquires the vehicle speed V from the vehicle speed sensor 44.

In step S9, the reaction force ECU 46 establishes threshold values for the low remaining electric power level (the fourth and fifth reaction force increasing threshold values TH4, TH5) in the map for the low remaining electric power level in relation to the vehicle speed V. As shown in FIG. 3, depending on the vehicle speed V, one or both of the fourth and fifth reaction force increasing threshold values TH4, TH5 may not be established.

In step S10, the reaction force ECU 46 acquires the pedal opening θ from the opening sensor 38. In step S11, the reaction force ECU 46 judges whether or not the pedal opening θ acquired in step S10 is equal to or greater than the threshold values for the high remaining electric power level established in step S6, or the threshold values for the low remaining electric power level established in step S9. If the pedal opening θ is equal to or greater than the threshold values established in step S6 or S9, i.e., the threshold values for the high remaining electric power level or the threshold values for the low remaining electric power level (step S11: YES), then in step S12, the reaction force ECU 46 increases the pedal reaction force Fr. If the pedal opening θ is not equal to or greater than the threshold values established in step S6 or S9, i.e., the threshold values for the high remaining electric power level or the threshold values for the low remaining electric power level (step S11: NO), then the reaction force ECU 46 does not increase the pedal reaction force Fr, but brings the present processing cycle to an end, and then proceeds to the next processing cycle, i.e., returns to step S1.

For example, if the map for the high remaining electric power level (FIG. 2) is selected, and the first and second reaction force increasing threshold values TH1, TH2 are established depending on the vehicle speed V, the reaction force ECU 46 compares the pedal opening θ with the first and second reaction force increasing threshold values TH1, TH2. If the pedal opening θ is equal to or greater than the first reaction force increasing threshold value TH1, but is not equal to or greater than the second reaction force increasing threshold value TH2, the reaction force ECU 46 increments the pedal reaction force Fr by one step (see FIGS. 4 and 5). Further, if the pedal opening θ is equal to or greater than the first and second reaction force increasing threshold values TH1, TH2, the reaction force ECU 46 increments the pedal reaction force Fr by two steps (see FIG. 4). Further, if the pedal opening θ is less than the first and second reaction force increasing threshold values TH1, TH2, the reaction force ECU 46 uses the ordinary pedal reaction force Fr (see FIGS. 4 and 5).

If the map for the low remaining electric power level (FIG. 3) is selected, and only the fourth reaction force increasing threshold value TH4 is established depending on the vehicle speed V, the reaction force ECU 46 compares the pedal opening θ with the fourth reaction force increasing threshold value TH4. If the pedal opening θ is equal to or greater than the fourth reaction force increasing threshold value TH4, the reaction force ECU 46 increments the pedal reaction force Fr by one step (see FIG. 6). Further, if the pedal opening θ is not equal to or greater than the fourth reaction force increasing threshold value TH4, the reaction force ECU 46 uses the ordinary pedal reaction force Fr (see FIG. 6).

3. Advantages of the Present Embodiment

According to the present embodiment, as described above, if the remaining electric power level of the battery 22 is low (step S3 of FIG. 7: NO), the pedal reaction force Fr is increased just short of switching from the ENG mode (first traveling mode), in which the vehicle 10 is driven only by the engine 14, to the ENG+MOT mode (second traveling mode), in which the vehicle 10 is driven by the engine 14 and the traction motor 16, i.e., while the vehicle 10 is being driven in the ENG mode (FIG. 3). Therefore, if the driver depresses the accelerator pedal 34 through an angle in excess of the pedal opening θ that increases the pedal reaction force Fr (i.e., the charging promotion assistance threshold value TH4), it is possible for the vehicle 10 to be driven with the engine 14 and the traction motor 16, and hence a large driving force can be generated depending on the driver's intention to accelerate the vehicle 10.

Further, if the driver keeps the accelerator pedal 34 at an angle that does not exceed the charging promotion assistance threshold value TH4, the traction motor 16 is not energized. Consequently, it is possible to prevent consumption of electric power from the battery 22, which would otherwise be dissipated if the traction motor 16 were energized.

According to the present embodiment, the charging promotion assistance threshold value TH4 is established within the charging promotion region, in which the amount of electric power generated by the alternator 18, which is actuated when the engine 14 is driven by a unit amount of fuel, is maximized. Consequently, if the driver keeps the accelerator pedal 34 at the charging promotion assistance threshold value TH4 or in the vicinity thereof, it is possible for the amount of electric power generated by the alternator 18 to be relatively large. Therefore, it is possible to promote charging of the battery 22.

According to the present embodiment, if the remaining electric power level (SOC) of the battery 22 is high (step S3 of FIG. 7: YES), the MOT mode assistance threshold value TH1 for increasing the pedal reaction force Fr is established by the reaction force ECU 46 just short of switching from the MOT mode (third traveling mode) to the ENG mode (first traveling mode) (FIG. 2). Therefore, if the remaining electric power level of the battery 22 is high, the pedal reaction force Fr is increased just short of switching from the MOT mode (third traveling mode), in which the vehicle 10 is driven only by the traction motor 16, to the ENG mode (first traveling mode), in which the vehicle 10 is driven by only the engine 14, i.e., while the vehicle 10 is being driven in the MOT mode. Generally, while the vehicle 10 is being driven in a low speed range, in comparison to being driven by the engine 14, the mileage of the vehicle 10 is higher if the vehicle 10 is driven only by the traction motor 16. With the above arrangement, therefore, it is possible to cause the driver to promote driving of the vehicle 10 with only the traction motor 16, for thereby driving the vehicle 10 with higher mileage, by having the driver recognize that switching is taking place between driving of the vehicle 10 with only the traction motor 16, and driving of the vehicle 10 with only the engine 14.

According to the present embodiment, if the remaining electric power level of the battery 22 is high, the MOT mode (third traveling mode) is permitted (FIG. 2), whereas if the remaining electric power level of the battery 22 is low, the MOT mode is prohibited (FIG. 3). In this case, if the opening of the accelerator pedal is zero, if the pedal reaction force Fr is not generated by the reaction force motor 40, or if the reaction force generating command Sr is not supplied from the reaction force ECU 46 to the reaction force motor 40 (step S1: YES), the control process at the time that the remaining electric power level of the battery 22 is high, and the control process at the time that the remaining electric power level of the battery 22 is low are switched (steps S3 through S9 of FIG. 7). Therefore, it is possible to prevent the driver from feeling uncomfortable due to the occurrence of switching between the control process at the time that the remaining electric power level of the battery 22 is high, and the control process at the time that the remaining electric power level of the battery 22 is low.

According to the present embodiment, the ENG mode, in which all the cylinders of the engine 14 are enabled (the all-cylinder-enabled mode), and the cylinder-disabled mode, in which only some of the cylinders of the engine 14 are enabled, are established as a driving mode (first traveling mode) of the vehicle 10 (FIGS. 2 and 3). Using the cylinder-disabled mode together with the ENG mode, it is possible to drive the vehicle 10 while fuel consumption is taken into consideration.

According to the present embodiment, the cylinder-disabled mode is established in a region within which the vehicle speed V exceeds the vehicle speed V at which the MOT mode (third traveling mode) is established (FIG. 2). Therefore, when the MOT mode in which the vehicle 10 is driven only by the traction motor 16 is switched to the cylinder-disabled mode, only some of the cylinders of the engine 14 are enabled for thereby improving fuel consumption and achieving better mileage.

According to the present embodiment, the reaction force ECU 46 (which makes up part of the reaction force applying unit) establishes the cylinder-disabling assistance threshold values TH3, TH5 for increasing the pedal reaction force Fr just short of switching between the cylinder-disabled mode and the ENG mode (all-cylinder-enabled mode), thereby informing the driver that switching is taking place between the cylinder-disabled mode and the ENG mode. As a result, for example, by the driver maintaining the cylinder-disabled mode, fuel consumption can be improved.

According to the present embodiment, the cylinder-disabling assistance threshold value TH3 is established so as to be less than the high efficiency output assistance threshold value TH2 (first accelerator pedal opening threshold value), and the cylinder-disabling assistance threshold value TH5 is established so as to be less than the charging promotion assistance threshold value TH4 (first accelerator pedal opening threshold value). Therefore, it is possible to apply a pedal reaction force Fr in consideration of energy efficiency.

According to the present embodiment, the MOT mode assistance threshold value TH1 (second accelerator pedal opening threshold value) and the cylinder-disabling assistance threshold value TH3 are established on the basis of the pedal opening θ (requested driving force Freq) and the vehicle speed V (FIG. 2). In this case, when the threshold value TH1 and the threshold value TH3 are switched depending on the vehicle speed V, the threshold value TH1 and the threshold value TH3 are set to consecutive values (FIG. 2). Therefore, upon switching of the threshold value TH1 and the threshold value TH3, the pedal reaction force Fr does not change significantly, thereby making it possible to prevent the driver from feeling uncomfortable.

B. Modifications

The present invention is not limited to the above embodiment, but may employ various arrangements based on the present disclosure and the descriptions herein. For example, the present invention may employ the following arrangements.

1. Objects in which the Invention May be Incorporated

In the above embodiment, the vehicle travel control apparatus 12 is incorporated in the vehicle 10, which includes the engine 14 and the traction motor 16 as drive sources for generating driving forces. However, the vehicle travel control apparatus 12 may be incorporated in other types of vehicles that include a plurality of drive sources the operating states of which can be switched depending on actions from the user. For example, the arrangement shown in FIG. 1, in which the traction motor 16 is coupled directly to the engine 14 for driving the drive wheels, e.g., the front wheels, may additionally include one or two traction motors (second traction motor) for driving other drive wheels, e.g., the rear wheels. Stated otherwise, the present invention may be applied to a four-wheel-drive hybrid vehicle. On such a four-wheel-drive hybrid vehicle, the engine 14 may be assisted by the second traction motor or motors in the ENG+MOT mode.

Alternatively, the present invention may also be applied to a vehicle having a plurality of traction motors as drive sources. The present invention may further be applied not only to the vehicle 10 but also to an apparatus having a plurality of drive sources the operating states of which can be switched depending on a user's action, e.g., a crane, a human-operated machine tool, or the like.

2. Traction Motor 16

In the above embodiment, while the engine 14 is in operation, the traction motor 16 either is not operated (ENG mode), or is operated together with the engine 14 (ENG+MOT mode). However, the traction motor 16 may be operated in a regenerative mode, so as to generate electric power under the drive power from the engine 14. Stated otherwise, the traction motor 16 may function in a similar manner as the alternator 18. In this case, the charging promotion assistance threshold value TH4 may be established in a region in which the amount of electric power generated by the traction motor 16, which is actuated when the engine 14 is driven by a unit amount of fuel, is equal to or greater than a predetermined electric power level threshold value, for example. Therefore, if the driver maintains the accelerator pedal 34 at the charging promotion assistance threshold value TH4 or in the vicinity thereof, it is possible to make the amount of electric power generated by the traction motor 16 relatively large. Consequently, it is possible to promote charging of the battery 22.

If the second traction motor or motors are used in addition to the engine 14 and the traction motor 16 (four-wheel-drive hybrid vehicle), as described above, then the vehicle may be driven by the engine 14 and the second traction motor or motors in the ENG+MOT mode. At the same time that the ENG+MOT mode is carried out by the engine 14 and the second traction motor or motors, for example, the traction motor 16 may be operated in a regenerative mode in order to generate electric power under drive power from the engine 14 for thereby charging the battery 22.

3. Switching Between Traveling Modes

[3-1. Characteristics Depending on the Remaining Electric Power Level of the Battery 22]

In the above embodiment, the traveling modes (MOT mode, ENG mode, ENG+MOT mode, and cylinder-disabled mode) are switched according to two characteristics, one of which occurs when the remaining electric power level of the battery 22 is large, and one of which occurs when the remaining electric power level of the battery 22 is small (FIGS. 2 and 3). However, three or more characteristics may be established for switching between traveling modes depending on the remaining electric power level of the battery 22.

In the above embodiment, the MOT mode, the ENG mode, the ENG+MOT mode, and the cylinder-disabled mode are established as switchable modes at the time that the remaining electric power level of the battery 22 is large (FIG. 2). In addition, the ENG mode, the ENG+MOT mode, and the cylinder-disabled mode are established as switchable modes at the time that the remaining electric power level of the battery 22 is small (FIG. 3). However, the traveling modes may be combined in other ways. For example, when the remaining electric power level of the battery 22 is large, a combination of the MOT mode, the ENG mode, and the ENG+MOT mode, a combination of the ENG mode and the ENG+MOT mode, or a combination of the MOT mode and the ENG+MOT mode may be established. When the remaining electric power level of the battery 22 is small, a combination of the ENG mode and the ENG+MOT mode may be established.

Figure 8:
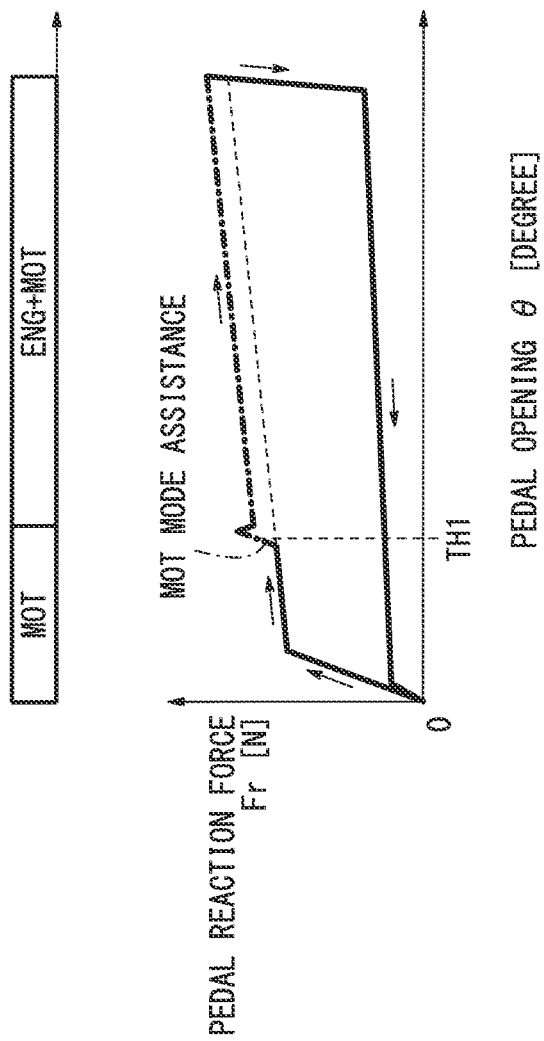
FIG. 8 is a diagram showing a modification of the relationship between the pedal opening and the pedal reaction force, in the case that the pedal opening is increased and then reduced at a time when the remaining electric power level of the battery is high.

FIG. 8 is a diagram showing a modification of the relationship between the pedal opening θ and the pedal reaction force Fr, in the case that the pedal opening θ is increased and then reduced at a time when the remaining electric power level of the battery 22 is high.

According to the modification shown in FIG. 8, when the pedal opening θ increases from zero, the MOT mode is selected first. As the pedal opening θ goes higher, the MOT mode changes to the ENG+MOT mode. Just short of changing from the MOT mode to the ENG+MOT mode at the MOT mode assistance threshold value TH1, the pedal reaction force Fr increases sharply, thereby enabling the driver to recognize that switching is taking place from the MOT mode to the ENG+MOT mode. The characteristic shown in FIG. 8 can be applied if the driver has depressed the accelerator pedal 34 at a high rate [°/sec] in excess of a predetermined depression rate threshold value, and the pedal opening θ is large in excess of a predetermined opening threshold value. The modification shown in FIG. 8 enables acceleration of the vehicle 10 to be increased sharply in situations where the vehicle 10 needs to be accelerated quickly.

[3-2. Switching Criteria]

In the above embodiment (FIGS. 2 and 3), the traveling modes (MOT mode, ENG mode, ENG+MOT mode, and cylinder disabled mode) are switched depending on the vehicle speed V and the pedal opening θ (requested driving force Freq). However, the traveling modes may be switched depending on other switching criteria, insofar as such switching criteria include the pedal opening θ (requested driving force Freq). For example, the traveling modes may be switched depending on only the pedal opening θ (requested driving force Freq). Alternatively, the traveling modes may be switched depending on the vehicle acceleration [km/h/s] and the pedal opening θ (requested driving force Freq).

[3-3. MOT Mode Assistance Threshold Value TH1]

In the above embodiment, the MOT mode assistance threshold value TH1 is used. However, the MOT mode assistance threshold value TH1 need not necessarily be used, as long as the high efficiency output assistance threshold value TH2 and the charging promotion assistance threshold value TH4 are used.

In the above embodiment, when the remaining electric power level of the battery 22 is small, a threshold value similar to the MOT mode assistance threshold value TH1 is not used (FIG. 3). However, it is possible to establish a threshold value that is similar to the threshold value TH1, insofar as the threshold value is less than when the remaining electric power level of the battery 22 is large, for example.

[3-4. High Efficiency Output Assistance Threshold Value TH2 and Charging Promotion Assistance Threshold Value TH4]

In the above embodiment (FIGS. 2 and 3), the high efficiency output assistance threshold value TH2 and the charging promotion assistance threshold value TH4 for indicating switching from the ENG mode to the ENG+MOT mode are used as values within the high efficiency electric generating region (charging promotion region). However, other values may be used, insofar as such values are indicative of switching from the ENG mode to the ENG+MOT mode. For example, values may be established just short of switching from the ENG mode to the ENG+MOT mode.

In the above embodiment (see FIGS. 2 and 3), both the high efficiency output assistance threshold value TH2 and the charging promotion assistance threshold value TH4 are used for indicating switching from the ENG mode to the ENG+MOT mode. However, only one of the high efficiency output assistance threshold value TH2 and the charging promotion assistance threshold value TH4 may be used.

In the above embodiment, the high efficiency output assistance threshold value TH2 and the charging promotion assistance threshold value TH4 are established as values within a region (high efficiency electric generating region or charging promotion region) in which the energy·torque, which is obtained by a unit amount (e.g., 1 cc) of fuel, is maximum. However, the high efficiency output assistance threshold value TH2 and the charging promotion assistance threshold value TH4 may be established in other ways. For example, as shown in FIG. 9, the threshold values TH2, TH4 may be established as a pedal opening θ at the best fuel consumption point, or as a pedal opening θ that lies within a best fuel consumption region, which is obtained on the basis of the net fuel consumption ratio (BSFC) from the relationship between the pedal opening θ (requested driving force Freq) and the vehicle speed V.

As shown in FIG. 9, when the vehicle speed V is V1 and the best fuel consumption point (at the center of the best fuel consumption region R1), which is obtained on the basis of the BSFC, is P1, the threshold values TH2, TH4 may be established as corresponding to the best fuel consumption point P1. However, a different value that lies within the best fuel consumption region R1 may be established as the threshold values TH2, TH4. As shown in FIG. 9, if the pedal opening θ is used as the threshold value TH2 or TH4, the requested driving force Freq is indicated as Freq1, and a driving force that contributes to traveling of the vehicle 10 is indicated as Freq2. The driving force, which corresponds to the difference between Freq1 and Freq2 (Freq1−Freq2), can be made available to actuate the traction motor 16 in order to generate electric power, or to actuate the alternator 18.

The best fuel consumption region R1 and the best fuel consumption point P1, which are obtained on the basis of the BSFC, change depending on the vehicle speed V and the requested driving force Freq the torque of the engine 14), and are represented by an optimum fuel consumption curve C1. A curve, which is denoted by "WOT" in FIG. 9, represents the relationship between the vehicle speed V and the requested driving force Freq when the vehicle 10 is driven in a WOT (Wide Open Throttle) state. When the best fuel consumption region R1 or the best fuel consumption point P1, which is obtained on the basis of the BSFC, is used, charging of the battery 22 can be promoted while the efficiency of the engine 14 remains high.

The vehicle speed V in FIG. 9 may be replaced with the engine rotational speed [rpm]. The requested driving force Freq in FIG. 9 may be replaced with the torque of the engine 14. Further, the relationship between the pedal opening θ and the vehicle speed V, or the relationship between the pedal opening θ and the engine rotational speed may be changed depending on the transmission ratio (gear position).

In the above embodiment, the high efficiency output assistance threshold value TH2 and the charging promotion assistance threshold value TH4 are established from the relationship between the vehicle speed V and the pedal opening θ (requested driving force Freq) (see FIGS. 2 and 3). However, the threshold values TH2, TH4 may be established based on other relationships if the efficiency of the engine 14 is high, or so long as charging of the battery 22 can be promoted. For example, if the best fuel consumption point or the best fuel consumption region is determined on the basis of the net fuel consumption ratio (BSFC), then instead of the relationship between the vehicle speed V and the pedal opening θ, the threshold values TH2, TH4 may be established from the relationship between the engine rotational speed [rpm] and the pedal opening θ or the throttle valve opening, or from the relationship between the transmission ratio (gear position), the engine rotational speed, and the pedal opening θ or the throttle valve opening.

[3-5. Cylinder-Disabling Assistance Threshold Values TH3, TH5]

In the above embodiment, the cylinder-disabling assistance threshold value TH3 is established within a region in which the vehicle speed V is greater than with the MOT mode assistance threshold value TH1 (the left side threshold value TH1 in FIG. 2). However, the cylinder-disabling assistance threshold value TH3 may be established in other ways, from the standpoint of switching between the MOT mode (third traveling mode) and the cylinder-disabled mode. For example, the cylinder-disabling assistance threshold value TH3 may be established within a region in which the pedal opening θ (requested driving force Freq) is greater than with the MOT mode assistance threshold value TH1 (the left side threshold value TH1 in FIG. 2).

In the above embodiment, the MOT mode assistance threshold value TH1 and the cylinder-disabling assistance threshold value TH3 are defined as consecutive values depending on the vehicle speed V (FIG. 2). However, the MOT mode assistance threshold value TH1 and the cylinder-disabling assistance threshold value TH3 need not necessarily be consecutive values.

In the above embodiment, both of the cylinder-disabling assistance threshold values TH3, TH5 are used. However, only one of the cylinder-disabling assistance threshold values TH3 or TH5 may be used. Alternatively, neither one of the cylinder-disabling assistance threshold values TH3, TH5 may be used, as long as the high efficiency output assistance threshold value TH2 and the charging promotion assistance threshold value TH4 are used.

The invention claimed is:

1. A vehicle travel control apparatus comprising:
    an electric motor configured to supply a first driving force to a drive wheel configured to drive a vehicle;
    an internal combustion engine configured to supply a second driving force to the drive wheel or the electric motor configured to drive the vehicle;
    an electric storage device configured to supply electric power to the electric motor, the electric storage device being chargeable and dischargeable; and
    a reaction force applying unit configured to apply a reaction force to an accelerator pedal;
    wherein the vehicle travel control apparatus establishes, as driving modes for the vehicle, a first traveling mode to drive the vehicle with only the internal combustion engine, and a second traveling mode to drive the vehicle with the internal combustion engine and the electric motor;

the vehicle travel control apparatus switches between the first traveling mode and the second traveling mode based on vehicle information including an opening of the accelerator pedal; and the vehicle travel control apparatus establishes the first traveling mode so as to correspond to the opening of the accelerator pedal, which is less than the opening of the accelerator pedal in the second traveling mode;

the vehicle travel control apparatus further comprising:

a remaining electric power level detecting unit configured to detect a remaining electric power level of the electric storage device;

wherein if the remaining electric power level detected by the remaining electric power level detecting unit is less than a first predetermined value, the reaction force applying unit establishes a first accelerator pedal opening threshold value for increasing the reaction force applied to the accelerator pedal short of switching from the first traveling mode to the second traveling mode, wherein the vehicle travel control apparatus establishes, as a driving mode for the vehicle, a third traveling mode to drive the vehicle with only the electric motor so as to correspond to the opening of the accelerator pedal, which is less than the opening of the accelerator pedal in the first traveling mode; and if the remaining electric power level detected by the remaining electric power level detecting unit is greater than a second predetermined value, the reaction force applying unit establishes a second accelerator pedal opening threshold value for increasing the reaction force applied to the accelerator pedal short of switching from the third traveling mode to the first traveling mode, and wherein the vehicle travel control apparatus:

permits the third traveling mode to be used if the remaining electric power level exceeds a second predetermined value;

inhibits the third traveling mode from being used if the remaining electric power level is less than the second predetermined value; and if the opening of the accelerator pedal is zero, if the reaction force is not generated by the reaction force applying unit, or if a reaction force generating command is not supplied from the reaction force applying unit, a control process at time the remaining electric power level exceeds the second predetermined value and a control process at time the remaining electric power level is less than the second predetermined value are switched.

2. The vehicle travel control apparatus according to claim 1, further comprising:

an electric generator configured to generate electric power in response to the internal combustion engine being operated, and to charge the electric storage device with the generated electric power;

wherein the first accelerator pedal opening threshold value is established in a region within which an amount of electric power generated by the electric generator, which is actuated when the internal combustion engine is driven by a unit amount of fuel, is equal to or greater than a first electric power level threshold value.

3. The vehicle travel control apparatus according to claim 1, further comprising:

an electric motor control unit configured to control the electric motor to be driven and to regenerate or generate electric power;

wherein the electric motor regenerates or generates electric power in response to the internal combustion engine being operated, and charges the electric storage device with the regenerated or generated electric power;

when the vehicle is driven in the first traveling mode, the electric motor control unit controls the electric motor so as to regenerate or generate electric power by the internal combustion engine; and the first accelerator pedal opening threshold value is established in a region within which the amount of electric power generated by the electric motor, which is actuated when the internal combustion engine is driven by a unit amount of fuel, is equal to or greater than a second electric power level threshold value.

4. The vehicle travel control apparatus according to claim 1, wherein the first traveling mode includes an all-cylinder-enabled mode in which all of cylinders of the internal combustion engine are enabled, and a cylinder-disabled mode in which only some of the cylinders of the internal combustion engine are enabled.

5. The vehicle travel control apparatus according to claim 4, wherein the reaction force applying unit establishes a cylinder-disabling assistance threshold value for increasing the reaction force applied to the accelerator pedal short of switching between the cylinder-disabled mode and the all-cylinder-enabled mode.

6. The vehicle travel control apparatus according to claim 5, wherein the cylinder-disabling assistance threshold value is established so as to be less than the first accelerator pedal opening threshold value.

7. The vehicle travel control apparatus according to claim 5, wherein the second accelerator pedal opening threshold value and the cylinder-disabling assistance threshold value are established on basis of the opening of the accelerator pedal, a requested or actual driving force or a throttle valve opening of the vehicle, and a vehicle speed or a rotational speed of the internal combustion engine; and if the second accelerator pedal opening threshold value and the cylinder-disabling assistance threshold value are switched depending on the vehicle speed or the rotational speed of the internal combustion engine, the second accelerator pedal opening threshold value and the cylinder-disabling assistance threshold value are established as consecutive values.

8. The vehicle travel control apparatus according to claim 7, wherein the reaction force applying unit establishes a cylinder-disabling assistance threshold value for increasing the reaction force applied to the accelerator pedal short of switching between the cylinder-disabled mode and the all-cylinder-enabled mode.

9. The vehicle travel control apparatus according to claim 8, wherein the second accelerator pedal opening threshold value and the cylinder-disabling assistance value are established on basis of the opening of the accelerator pedal, a requested or actual driving force or a throttle valve opening of the vehicle, and a vehicle speed or a rotational speed of the internal combustion engine; and if the second accelerator pedal opening threshold value and the cylinder-disabling assistance threshold value are switched depending on the vehicle speed or the rotational speed of the internal combustion engine, the second accelerator pedal opening threshold value and the cylinder-disabling assistance threshold value are established as consecutive values.

10. The vehicle travel control apparatus according to claim 7, wherein the cylinder-disabling assistance threshold value is established so as to be less than the first accelerator pedal opening threshold value.

11. The vehicle travel control apparatus according to claim 1, wherein the first traveling mode include an all-cylinder-enabled mode in which all of cylinders of the internal combustion engine are enabled, and a cylinder-disabled mode in which only some of the cylinders of the internal combustion engine are enabled, and wherein the cylinder-disabled mode is established in a region in which a speed of the vehicle exceeds a vehicle speed at which the third traveling mode is established.

12. A vehicle travel control apparatus, comprising:

a first motor configured to generate electric power;

a second motor configured to supply a first driving force to a drive wheel configured to drive a vehicle;

an internal combustion engine configured to supply a second driving force to the drive wheel configured to drive the vehicle or to the first motor;

an electric storage device configured to supply electric power to the second motor, the electric storage device being chargeable and dischargeable;

a reaction force applying unit configured to apply a reaction force to an accelerator pedal; and a remaining electric power level detecting unit configured to detect a remaining electric power level of the electric storage device, wherein the vehicle travel control apparatus establishes, as driving modes for the vehicle, a first driving mode to travel the vehicle with only the second motor without driving the internal combustion engine, and a second driving mode to travel the vehicle with the second motor while actuating the first motor with a driving force from the internal combustion engine in order to generate electric power;

the vehicle travel control apparatus switches between the first driving mode and the second driving mode based on vehicle information including an opening of the accelerator pedal; and the vehicle travel control apparatus establishes the first driving mode so as to correspond to the opening of the accelerator pedal, which is less than the opening of the accelerator pedal in the second driving mode;

if the remaining electric power level detected by the remaining electric power level detecting unit exceeds a first predetermined value, the reaction force applying unit establishes a first reaction-force-increasing threshold value as an accelerator pedal opening for increasing the reaction force applied to the accelerator pedal just prior to switching from the first driving mode to the second driving mode, and if the remaining electric power level is less than the first predetermined value, the reaction force applying unit establishes a second reaction-force-increasing threshold value as the accelerator pedal opening for increasing the reaction force applied to the accelerator pedal in the second driving mode.

13. The vehicle travel control apparatus according to claim 12, wherein if the remaining electric power level is less than the first predetermined value, the vehicle travel control apparatus inhibits the first driving mode from being used, and the reaction force applying unit establishes the accelerator pedal opening, as the second reaction-force-increasing threshold value, in a range within which an amount of electric power generated by the first motor, which is actuated when the internal combustion engine is driven by a unit amount of fuel, is equal to or greater than a first electric power level threshold value.

14. The vehicle travel control apparatus according to claim 12, wherein if the remaining electric power level is less than the first predetermined value, the vehicle travel control apparatus inhibits the first driving mode from being used, and the reaction force applying unit establishes the accelerator pedal opening, as the second reaction-force-increasing threshold value, on a best fuel consumption point or within a best fuel consumption region, which are obtained based on a net fuel consumption ratio of the internal combustion engine.

15. The vehicle travel control apparatus according to claim 12, wherein the vehicle travel control apparatus is configured to:

permit the first driving mode to be used if the remaining electric power level exceeds the first predetermined value;

inhibit the first driving mode from being used if the remaining electric power level is less than the first predetermined value; and if the opening of the accelerator pedal is zero, if the reaction force is not generated by the reaction force applying unit, or if a reaction force generating command is not supplied from the reaction force applying unit, a control process at a time the remaining electric power level exceeds the first predetermined value and a control process at a time the remaining electric power level is less than the first predetermined value are switched.

16. A vehicle travel control apparatus, comprising:

an electric motor configured to supply a first driving force to a drive wheel configured to drive a vehicle;

an internal combustion engine configured to supply a second driving force to the drive wheel configured to drive the vehicle or to the electric motor;

an electric storage device configured to supply electric power to the electric motor, the electric storage device being chargeable and dischargeable;

a reaction force applying unit configured to apply a reaction force to an accelerator pedal; and a remaining electric power level detecting unit configured to detect a remaining electric power level of the electric storage device, wherein the vehicle travel control apparatus establishes, as driving modes for the vehicle, a first driving mode to travel the vehicle only with the electric motor, and a second driving mode to travel the vehicle with a combination of the internal combustion engine and the electric motor or only with the internal combustion engine;

the vehicle travel control apparatus switches between the first driving mode and the second driving mode based on vehicle information including an opening of the accelerator pedal;

the vehicle travel control apparatus establishes the first driving mode so as to correspond to the opening of the accelerator pedal, which is less than the opening of the accelerator pedal in the second driving mode; and if the remaining electric power level detected by the remaining electric power level detecting unit is less than a second predetermined value, the vehicle travel control apparatus inhibits the first driving mode from being used, and the reaction force applying unit establishes the accelerator pedal opening, as a third reaction-force-increasing threshold value for increasing the reaction force applied to the accelerator pedal, on a best fuel consumption point or within a best fuel consumption range, which are obtained based on a net fuel consumption ratio of the internal combustion engine.

17. The vehicle travel control apparatus according to claim 16, further comprising an electric generator configured to generate electric power in response to the internal combustion engine being operated, and to charge the electric storage device with the generated electric power,
   wherein the third reaction-force-increasing threshold value is established to the accelerator pedal opening for generating a driving force requested for the electric generator to generate, in addition to a driving force that contributes to traveling of the vehicle.

18. The vehicle travel control apparatus according to claim 16, wherein the vehicle travel control apparatus is configured to:
   permit the first driving mode to be used if the remaining electric power level exceeds a second predetermined value;
   inhibit the first driving mode from being used if the remaining electric power level is less than the second predetermined value; and
   if the opening of the accelerator pedal is zero, if the reaction force is not generated by the reaction force applying unit, or if a reaction force generating command is not supplied from the reaction force applying unit, a control process at a time the remaining electric power level exceeds the second predetermined value and a control process at a time the remaining electric power level is less than the second predetermined value are switched.

* * * * *